(12) United States Patent
Isobe

(10) Patent No.: US 9,865,945 B2
(45) Date of Patent: Jan. 9, 2018

(54) ATTACHMENT STRUCTURE FOR HOUSING

(71) Applicant: DENSO WAVE INCORPORATED, Chita-gun, Aichi-pref. (JP)

(72) Inventor: Toshio Isobe, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/297,552

(22) Filed: Oct. 19, 2016

(65) Prior Publication Data
US 2017/0125927 A1 May 4, 2017

(30) Foreign Application Priority Data
Oct. 28, 2015 (JP) .................. 2015-211425

(51) Int. Cl.
*H02B 1/26* (2006.01)
*H01R 9/26* (2006.01)
*H02B 1/052* (2006.01)

(52) U.S. Cl.
CPC ......... *H01R 9/2608* (2013.01); *H02B 1/0526* (2013.01)

(58) Field of Classification Search
CPC . H02B 1/056; H02B 1/21; H02B 1/00; H01R 9/2458; H01R 9/26; H01R 9/2608
USPC .......................... 361/648, 611, 637; 439/716
See application file for complete search history.

(56) References Cited

U.S. PATENT DOCUMENTS

| | | | | |
|---|---|---|---|---|
| 6,172,875 B1* | 1/2001 | Suzuki | .................... | G06F 1/183 361/679.4 |
| 7,286,340 B2* | 10/2007 | Karim | .................... | H02B 1/042 200/294 |
| 9,444,231 B2* | 9/2016 | Ho | ........................ | H02B 1/0523 |
| 9,545,027 B2* | 1/2017 | Chiang | .................... | H05K 7/12 |

FOREIGN PATENT DOCUMENTS

| | | |
|---|---|---|
| JP | 2005-064114 A | 3/2005 |
| JP | 2013-214632 A | 10/2013 |

* cited by examiner

*Primary Examiner* — Hien Vu
(74) *Attorney, Agent, or Firm* — Oliff PLC

(57) ABSTRACT

An attachment structure for attaching a recess of a housing to a DIN rail includes first and second movable strips. The first movable strip extends continuously from an operable portion and being movable along a surface of the housing in a first direction toward the recess and in a second direction opposite from the first direction. A first claw of the first movable strip and a second claw of the second movable strip move toward the DIN rail in accordance with a movement of the first movable strip in the first direction and engage ledges of the DIN rail. A koma converts the movement of the first movable strip in the first or second direction to a movement of the second movable strip in a direction opposite from the movement direction of the first movable strip.

8 Claims, 15 Drawing Sheets

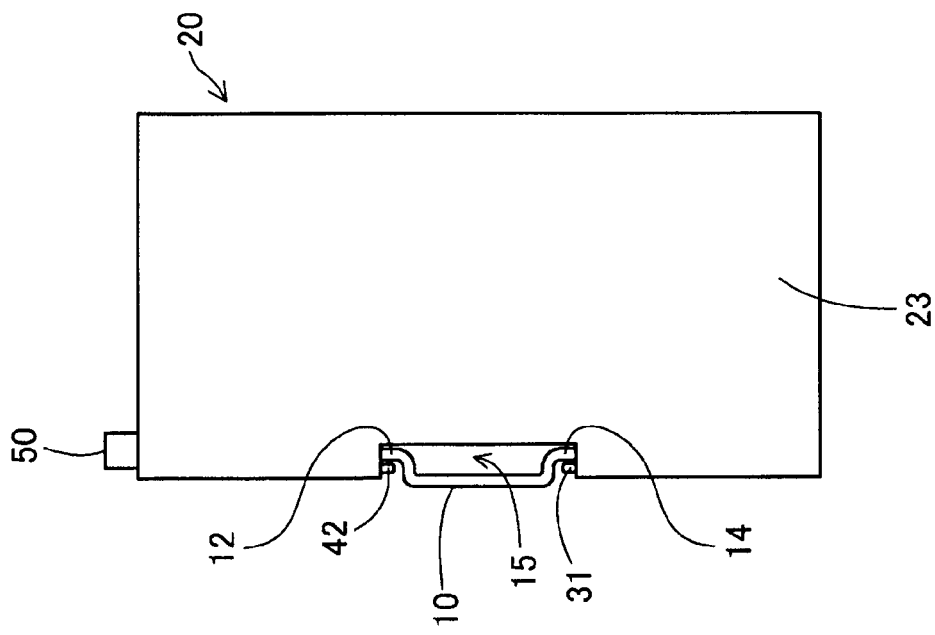
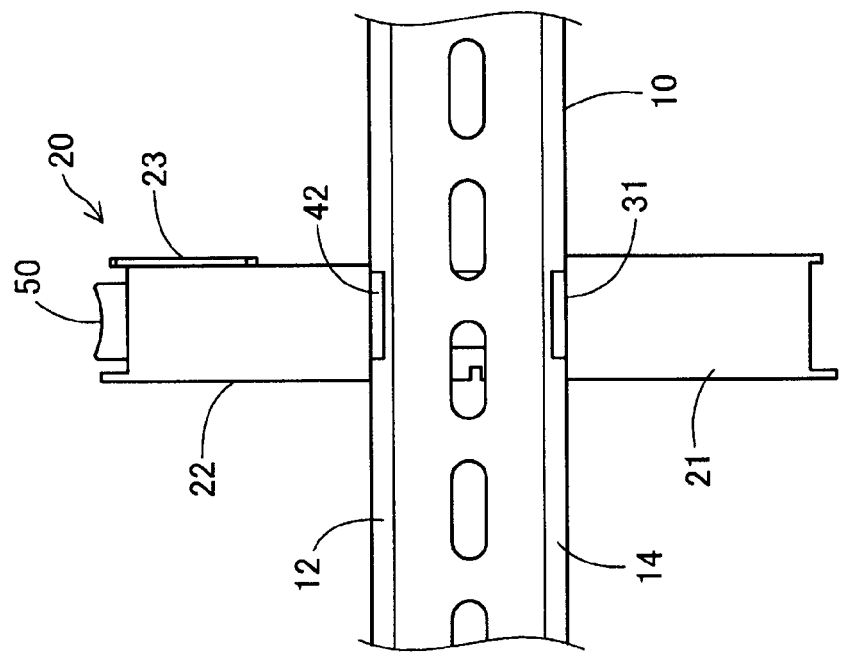

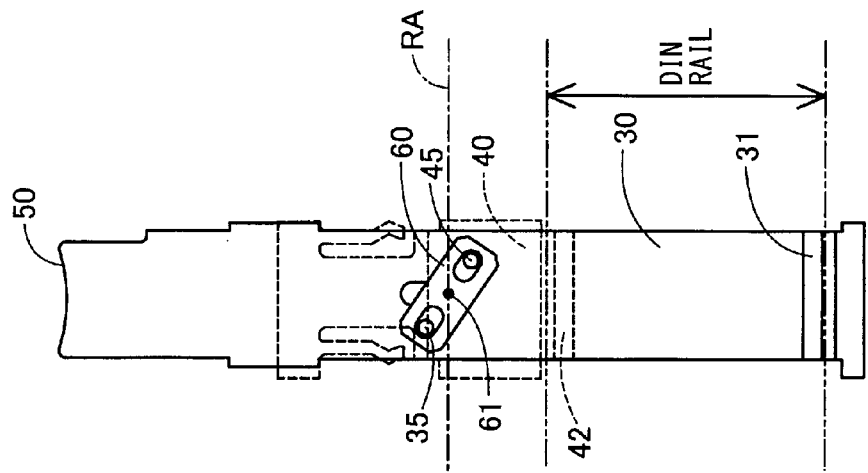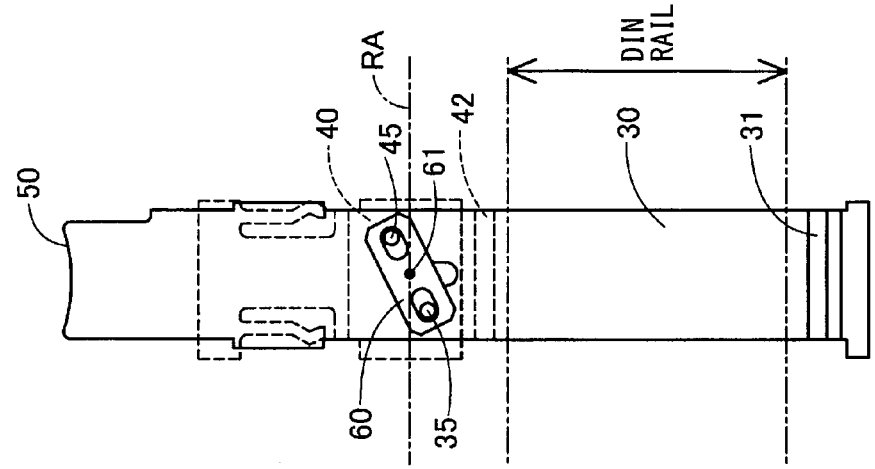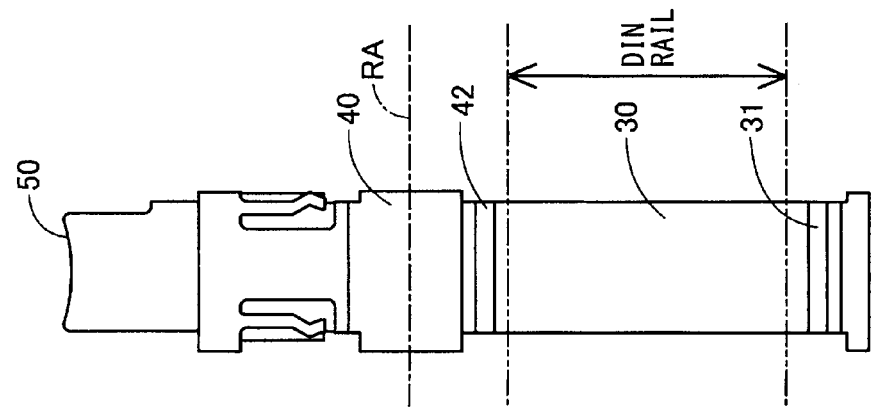

FIG. 9A
FIG. 9B
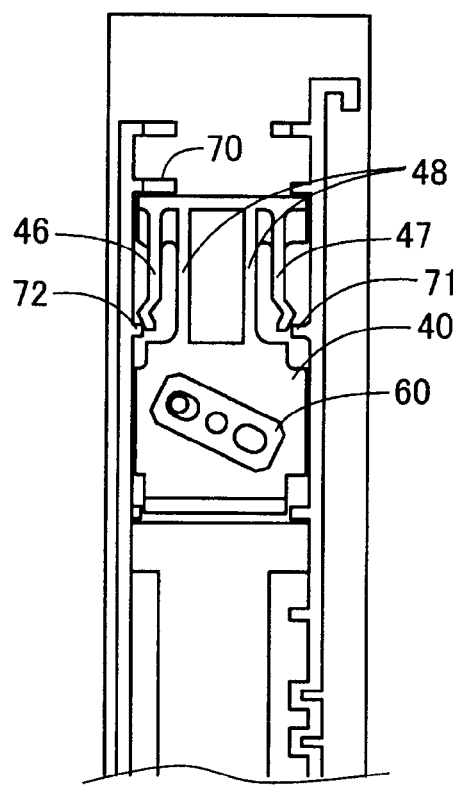
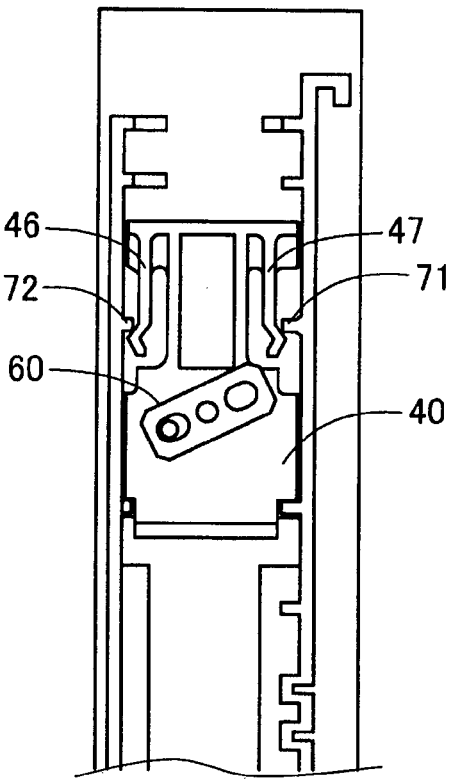

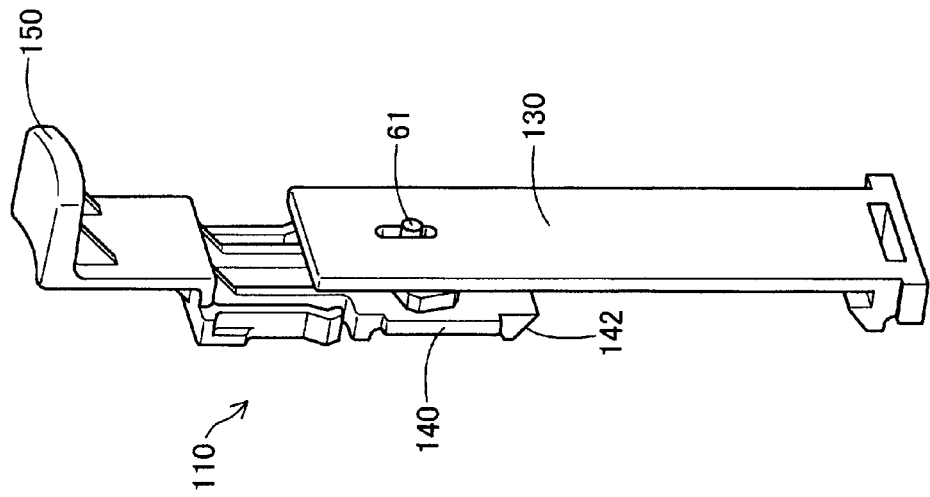
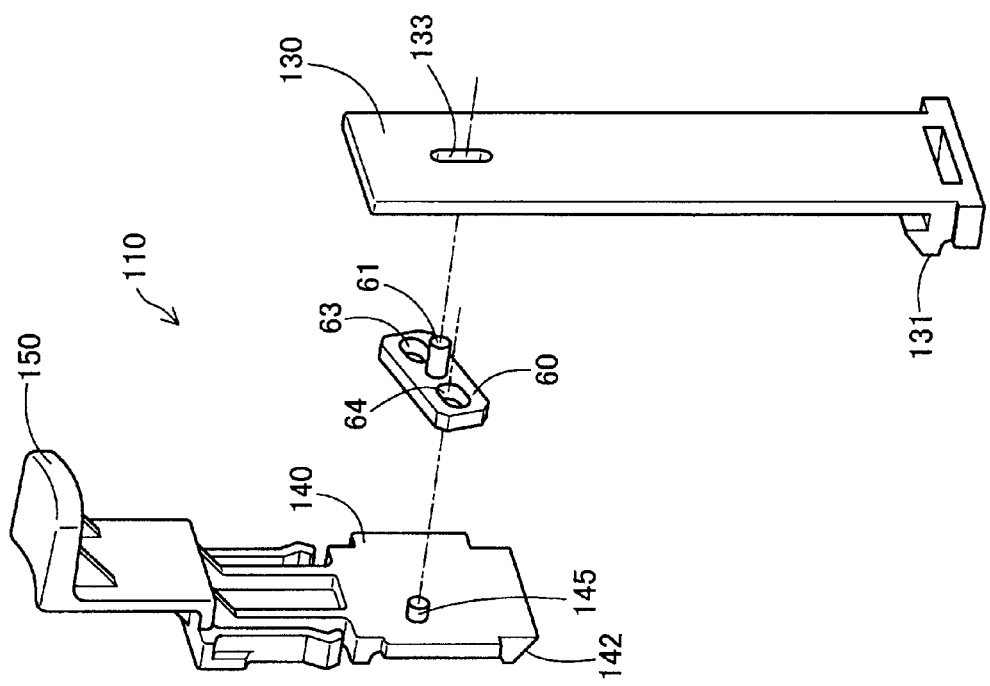

FIG. 12A
FIG. 12B
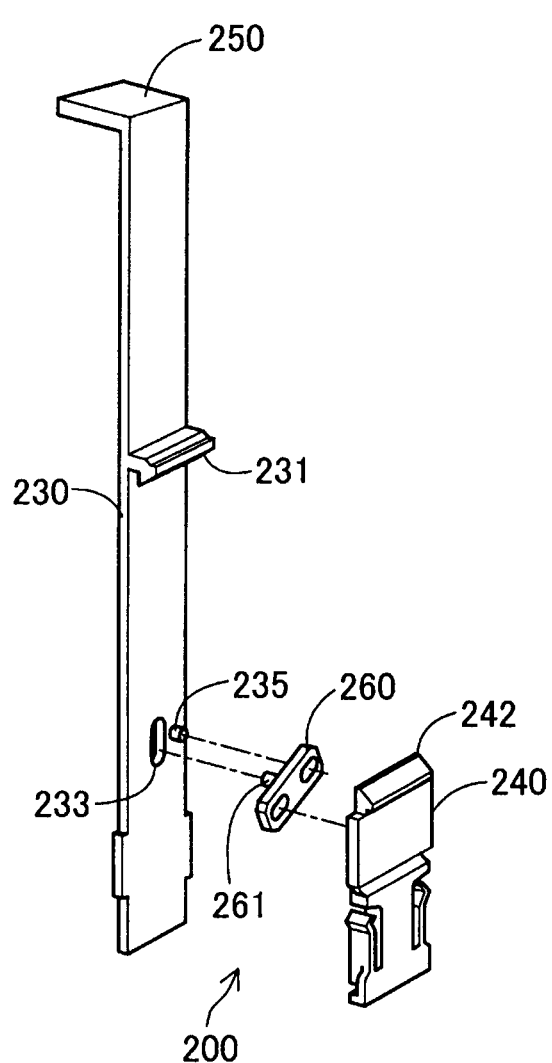
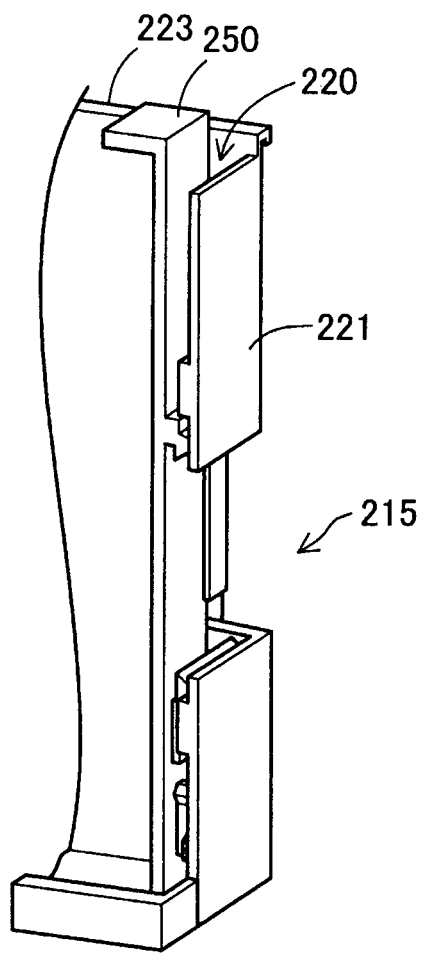

FIG. 14A
FIG. 14B
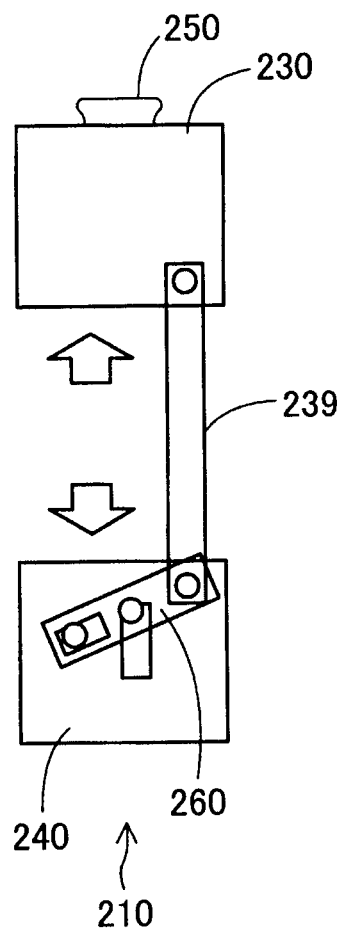
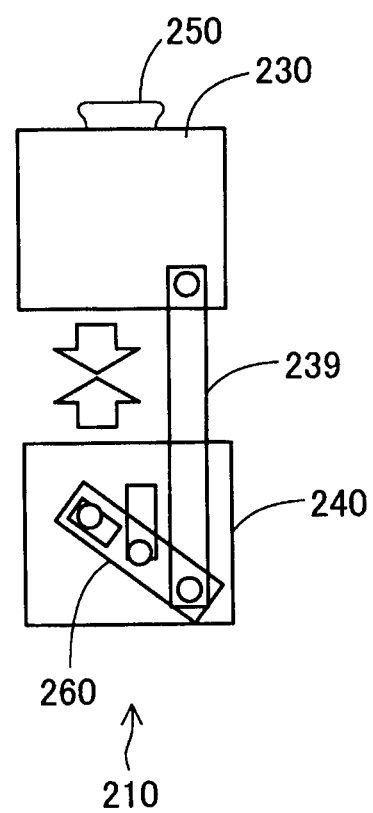

FIG. 15A
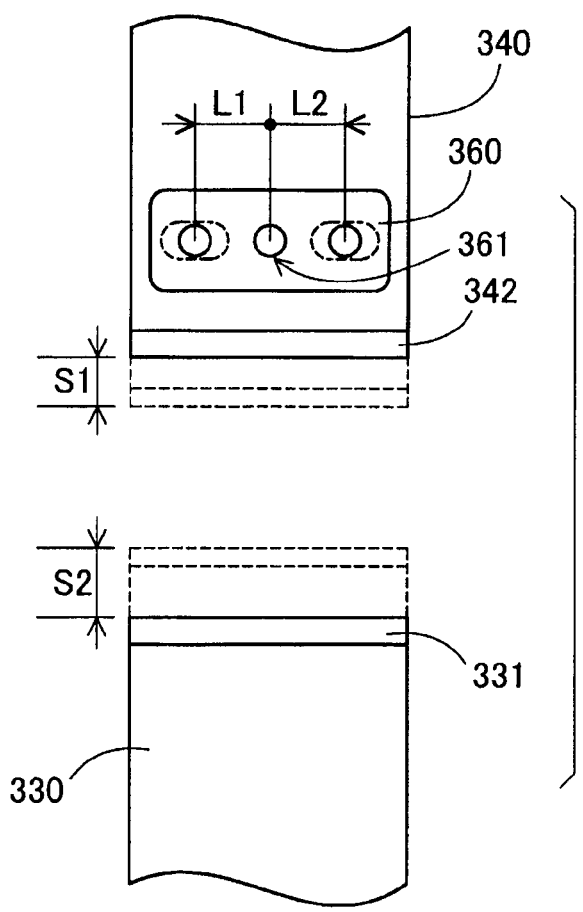
FIG. 15B
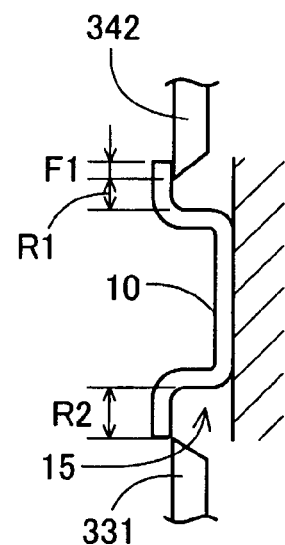
FIG. 15C
| L1=L2 | L1>L2 | L1<L2 |
|---|---|---|
| S1=S2 | S1>S2 | S1<S2 |
| | | R1<R2<br>F1+R1=R2 |

ATTACHMENT STRUCTURE FOR HOUSING

CROSS REFERENCE TO RELATED APPLICATION

This application is based on and incorporates herein by reference Japanese Patent Application No. 2015-211425 filed on Oct. 28, 2015.

TECHNICAL FIELD

The present disclosure relates to an attachment structure attaching a housing to a rail.

BACKGROUND

In a manufacturing line of a factory, a variety of devices is attached to a control panel. In order to generalize the attaching of the devices, a standardized attachment rail may be used. One of such rail is, for example, a DIN rail. The DIN rail is shaped to have ledges on both sides of the DIN rail in a width direction of the DIN rail, and each ledge protrudes from a center part of the DIN rail by a few millimeters and has approximately 5 millimeters of dimension in the width direction. On the other hand, a device to be attached to the DIN rail includes a housing provided with an attachment structure that attaches the housing to the DIN rail, for example, as disclosed in Patent Document 1 (JP 2013-214632 A) or Patent Document 2 (JP 2005-064114 A).

In such attachment structure of the housing, a recess is provided on the housing such that a widest portion of the rail is fit to the recess. In a state where the housing is fitted to the rail, an operable portion is operated to cause a claw as an engagement portion to protrude toward the ledge of the rail and to prevent the housing from dropping from the rail. An inner wall of the recess of the housing is in contact with side edges of the rail and limits movement of the housing in the width direction of the rail. In such state, since the claw protrudes toward and engages with the ledge of the rail, the housing can be prevented from dropping from the rail even when the housing moves in an up-down direction.

Conventional attachment structures of housings have some variations of claws engaging ledges provided on opposite sides of a rail. One of the variations is a structure including a movable claw and a fixed claw as a pair of claws which are located on an upper side and a lower side of the rail, respectively, and corresponds to ledges on opposite sides of the rail in its width direction. When such housing is attached to the rail, the fixed claw is first engaged with one of the ledges of the rail, and then the movable claw is engaged with another of the ledges of the rail. Another of the variations is a structure in which both of claws are movable. In this case, a recess of the housing is fitted to the rail first, and then an operable portion is operated to move the both claws inward of the rail in the width direction to be engaged with the respective ledges of the rail.

When one of the claws is fixed, a structure for moving the movable claw by operation of the operable portion can be made to be simple. However, since the fixed claw is used, an attachment procedure may become complicated. For example, when the housing is attached to the rail, the fixed claw is first engaged with the ledge of the rail while the housing is inclined with respect to the rail, and then the operable portion is operated while the housing is pressed against the rail. Furthermore, if the engagement of the fixed claw with the ledge is failed, the fixed claw may be broken. On the other hand, when both of the claws are movable, such breakage of the claw may not occur, but a structure for moving the claws in opposite directions may become complicated. When two operable portions are provided for the respective claws to move individually, the operator needs to operate the two operable portions separated in the up-down direction, in other words, operability of the attachment structure is not sufficient.

SUMMARY

It is an object of the present disclosure to provide an attachment structure capable of attaching a housing to a DIN rail easily.

According to an aspect of the present disclosure, an attachment structure is used for attaching a housing to a DIN rail by fitting a recess provided on a surface of the housing to the DIN rail. The attachment structure includes an operable portion, a first movable strip, a second movable strip and a koma. The operable portion is operable by an operator, and the first movable strip extends continuously from the operable portion and is movable along the surface of the housing in a first direction toward the recess and in a second direction opposite from the first direction. The first movable strip includes a first claw that moves toward the DIN rail in accordance with a movement of the first movable strip in the first direction and engages a ledge of the DIN rail located adjacent to one of two edges of the recess. The second movable strip includes a second claw that moves toward the DIN rail in accordance with the movement of the first movable strip in the first direction and engages another ledge of the DIN rail located adjacent to another of the two edges of the recess. The koma converts the movement of the first movable strip in the first direction to a movement of the second movable strip in the second direction, and converts a movement of the first movable strip in the second direction to a movement of the second movable strip in the first direction.

According to the attachment structure, the housing can be attached to the DIN rail easily.

BRIEF DESCRIPTION OF THE DRAWINGS

The disclosure, together with additional objectives, features and advantages thereof, will be best understood from the following description, the appended claims and the accompanying drawings, in which:

FIG. 1A is a view showing a device provided with an attachment structure and attached to a DIN rail, according to a first embodiment of the present disclosure;

FIG. 1B is a lateral view showing the device and the DIN rail, according to the first embodiment;

FIG. 8A is a front view showing the attachment mechanism when an upper claw and a lower claw are separated from the DIN rail, according to the first embodiment;

FIG. 8B is a partially-transparent front view showing the attachment mechanism when the upper claw and the lower claw are separated from the DIN rail, according to the first embodiment;

FIG. 8C is a partially-transparent front view showing the attachment mechanism when the upper claw and the lower claw are engaged with the DIN rail, according to the first embodiment;

FIG. 9A is a back view showing the attachment mechanism without the first movable member when the upper claw and the lower claw are separated from the DIN rail, according the first embodiment;

FIG. 9B is a back view showing the attachment mechanism without the first movable member when the upper claw and the lower claw are engaged with the DIN rail, according the first embodiment;

FIG. 11A is a disassembled view showing the attachment mechanism according to the second embodiment;

FIG. 11B is an assembled view showing the attachment mechanism according to the second embodiment;

FIG. 12A is a disassembled view showing an attachment mechanism according to a third embodiment of the present disclosure;

FIG. 12B is an assembled view showing the attachment mechanism and its vicinity, according to the third embodiment;

FIG. 14A is a schematic view showing an attachment mechanism provided with a link mechanism when a first movable member and a second movable member move away from each other, according to a first modification of the present disclosure;

FIG. 14B is a schematic view showing the attachment mechanism provided with the link mechanism when the first movable member and the second movable member move toward each other, according the first modification;

FIG. 15A is a schematic view showing distances from a center axis to protrusion portions in a koma, and longest movement distances of the first and second movable members in an up-down direction, according to a second modification of the present disclosure;

FIG. 15B is a schematic view showing displacements of upper and lower claws, according to the second modification; and FIG. 15C is a diagram showing relationship between the distances from the center axis to the protrusion portions, the longest movement distances of the first and second movable members and the displacements of the upper and lower claws, according to the second modification.

DETAILED DESCRIPTION

Figure 2:
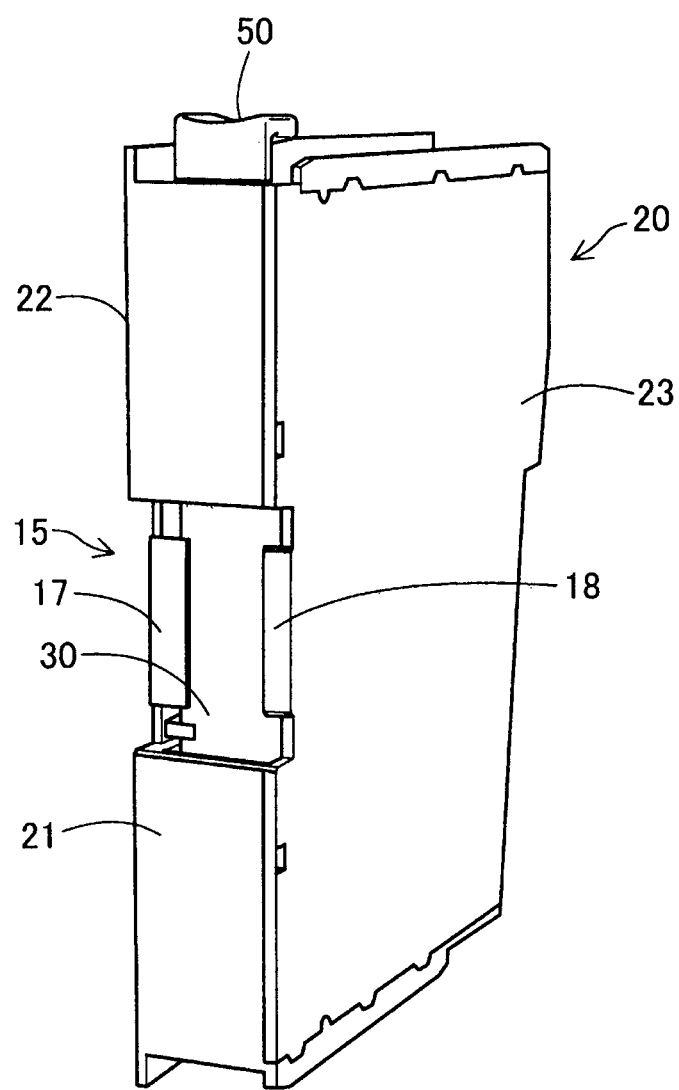
FIG. 2 is a perspective view showing the device according to the first embodiment.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 3:
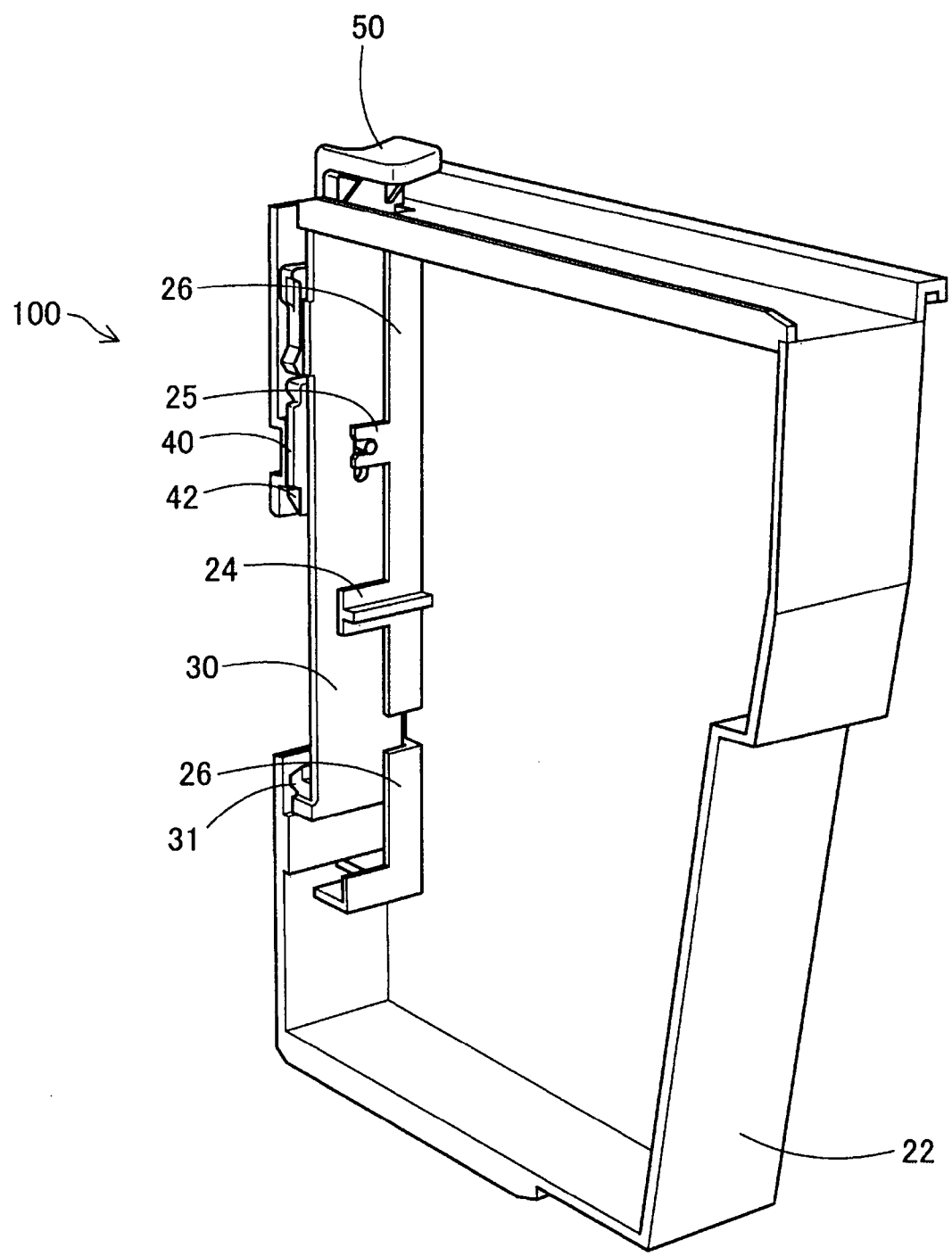
FIG. 3 is a perspective view showing the device without a casing cover, according to the first embodiment.

FIGS. 1A and 1B are explanatory diagrams showing an attachment structure that attaches a device 20 to a DIN rail 10. FIG. 1A illustrates a side of the device 20 when viewed from a back side of the DIN rail 10. The device 20 is attached to the DIN rail from the back side of the paper of FIG. 1A. In other words, the device 20 is attached to a front side of the DIN rail 10 that is opposite from the back side of the DIN rail 10. FIG. 1B shows lateral sides of the device 20 and the DIN rail 10 of FIG. 1A. FIG. 2 is a perspective view showing the device 20 that is to be attached to the DIN rail 10. FIG. 3 is a perspective view showing the device 20 but a casing cover 23 is omitted from the device 20.

The housing of the device 20 includes, as shown in FIGS. 2 and 3, a casing body 22 and the casing cover 23. The housing of the device 20 has an approximately cuboid shape. One of six surfaces constituting the housing of the device 20 is an attachment surface 21 that contacts the DIN rail 10. An attachment mechanism 100 described below is provided on the attachment surface 21. In the present specification, a longitudinal direction of the DIN rail 10 of FIG. 1 may be referred to as a right-left direction. A width direction of the DIN rail 10, i.e. a longitudinal direction of the device 20 attached to the DIN rail 10 may be referred to as an up-down direction. Further, a direction perpendicular to both the right-left direction and the up-down direction may be referred to as a depth direction.

An approximately center portion of the attachment surface 21 has, as shown in FIGS. 1 and 2, a recess 15 having a dimension in the up-down direction that is approximately the same as a widest width of the DIN rail 10. An upper claw 42 and a lower claw 31 for attachment of the housing are arranged on top and bottom of the recess 15. The upper claw 42 and the lower claw 31 are hidden in upper and lower edges of the recess 15, respectively, before the device 20 is attached to the DIN rail 10. When an operable portion 50 is operated, the upper claw 42 and the lower claw 31 protrude toward the DIN rail 10, in other words, the upper claw 42 protrudes downward while the lower claw 31 protrudes upward. According to the operation, the upper claw 42 and the lower claw 31 engages with ledges 12 and 14 located on different sides of the DIN rail 10 in the width direction (up-down direction). Guide plates 17 and 18 are provided in the recess 15 of the attachment surface 21. The guide plates 17 and 18 guide a reciprocating movement of a first movable member 30 in the up-down direction. The attachment mechanism 100 is disposed inside the attachment surface 21 and includes the first movable member 30. The attachment mechanism 100 may be used as an example of the attachment structure of the first embodiment.

The housing of the device 20 includes, as shown in FIGS. 2 and 3, the casing body 22 made of resin by molding, and the casing cover 23 fitted to a side surface of the casing body 22. The attachment mechanism 100 is housed in the casing body 22 behind the attachment surface 21. The attachment mechanism 100 is housed between a back side of the above-described guide plates 17 and 18 or a back side of the attachment surface 21 and a front side of partition walls 24 and 26 disposed inside the casing body 22. The casing cover 23 also has partition walls corresponding to the partition walls 24 and 26. When the casing cover 23 is fitted to the casing body 22, the attachment mechanism 100 is housed in a housing space defined by the partition walls 24 and 26 of the casing body 22 and the partition walls of the casing cover 23 behind the attachment surface 21. FIG. 3 shows a state of the device 20 from which the casing cover 23 is detached. In FIG. 3, illustrations of an electronic circuit housed in the housing is omitted in order to show the housing space and an outer shape of the device 20. The device 20 functions actually as a controller for controlling a process control, an interface performing an input or output operation with an external portion, or a sensor module measuring various physical quantities. Hence, the device 20 is a control instrument housing therein a substrate on which an electronic component for an intended use is mounted.

A part of the partition wall 26 inside the casing body 22 further extends in its extending direction and forms a bearing portion 25. As shown in FIG. 3, the bearing portion 25 has a notch at a center of its end and thus has an approximately U shape. A shaft of a koma 60 of the attachment mechanism 100 is rotatably fitted to the central notch of the bearing portion 25.

Figure 4:
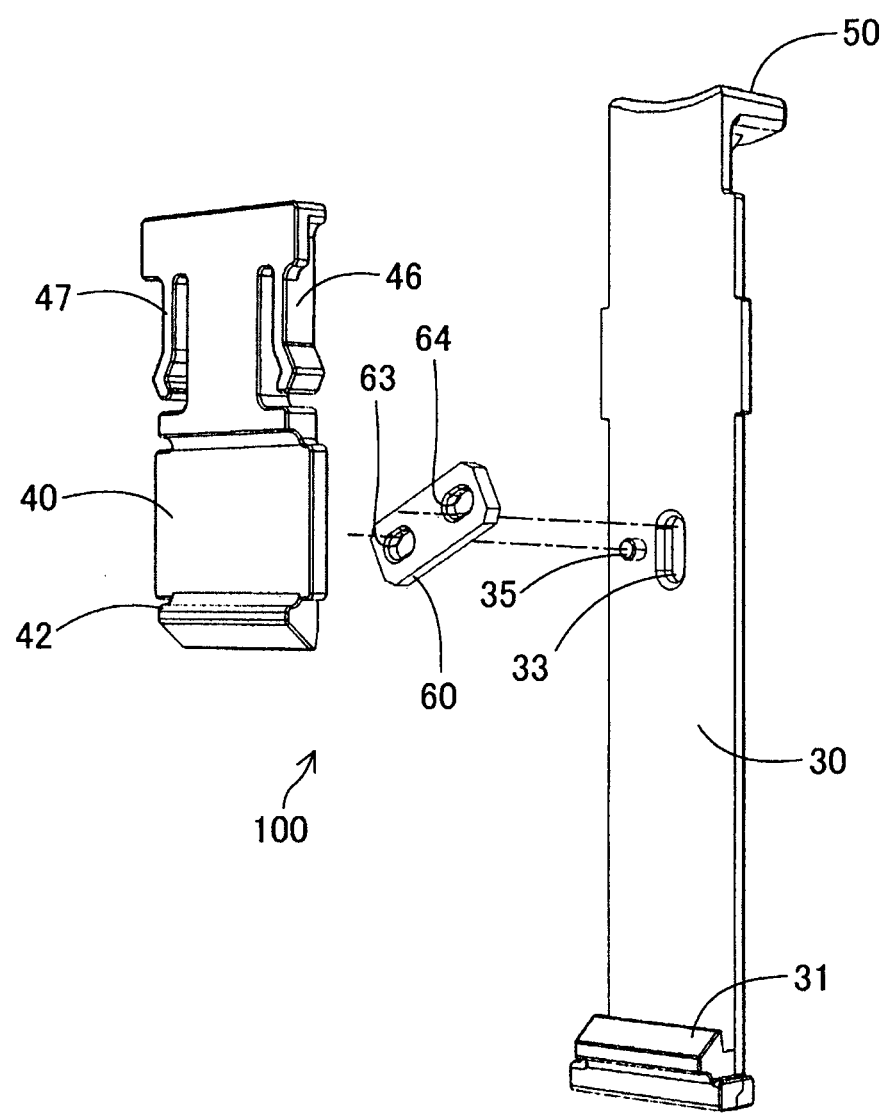
FIG. 4 is a disassembled view showing the attachment mechanism according to the first embodiment.
Figure 5:
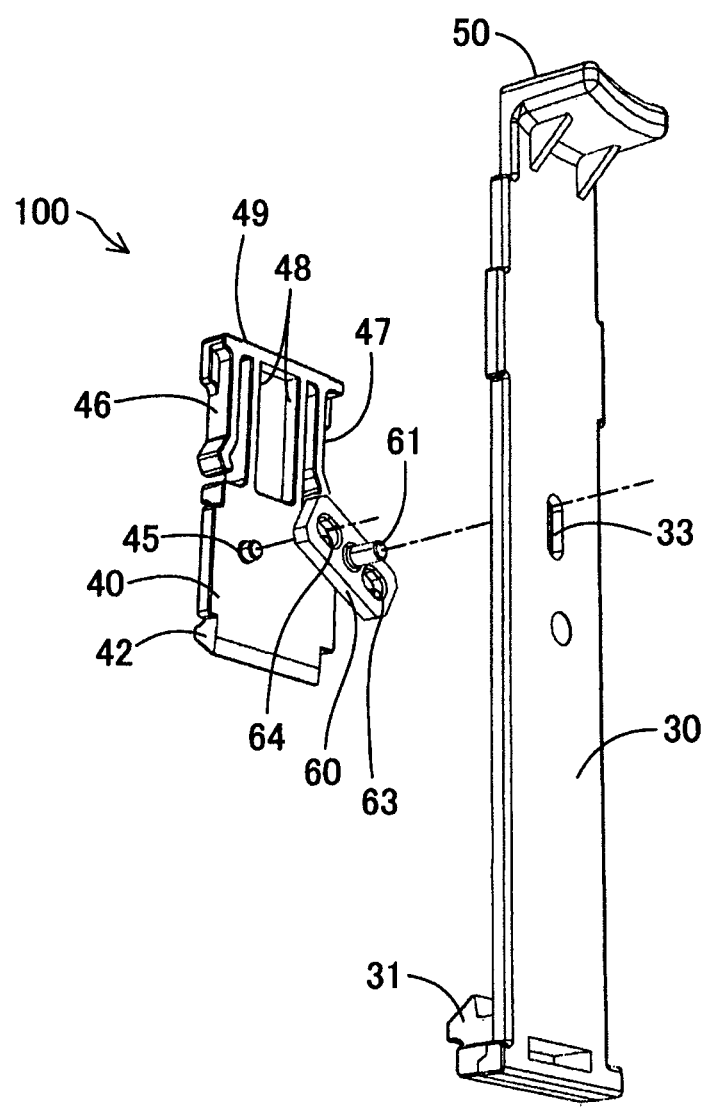
FIG. 5 is a disassembled view showing the attachment mechanism according to the first embodiment.
Figure 6:
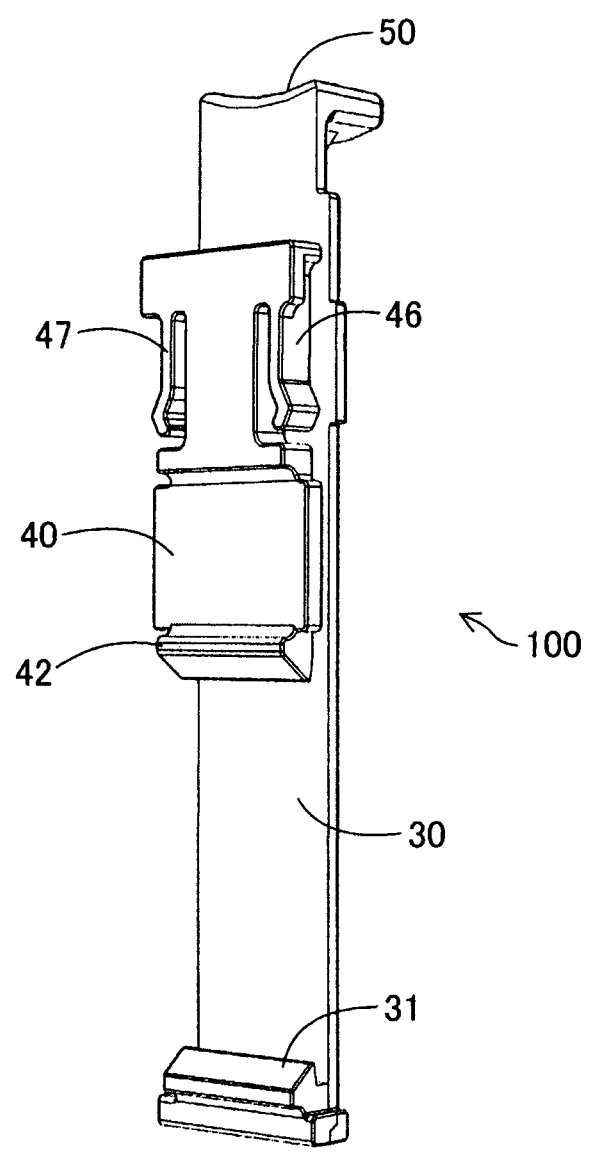
FIG. 6 is an assembled view showing the attachment mechanism according to the first embodiment.

Next, configurations of the attachment mechanism 100 realizing the attachment structure of the first embodiment will be described. FIGS. 4 and 5 are perspective disassembled views illustrating the attachment mechanism 100. FIG. 4 is a front view of the attachment mechanism 100, and FIG. 5 is a back view of the attachment mechanism 100. FIG. 6 is a perspective assembled view illustrating the attachment mechanism 100. As shown in these drawings, the attachment mechanism 100 includes the first movable member 30 reciprocable in the up-down direction behind the attachment surface 21, a second movable member 40 that is attached to the first movable member 30 and is reciprocable in the up-down direction, and the koma 60 interposed between the first and second movable members 30 and 40 such that the two movable members 30 and 40 are moved in conjunction with each other through the koma 60.

The first movable member 30 continuously extends from the operable portion 50 located on an upper end of the attachment mechanism 100. The lower claw 31 is formed on a lower end of the first movable member 30. The first movable member 30 has a through-hole 33 which has an oval shape and extends through a center part of the first movable member 30. The major axis of the through-hole 33 extends along the movement direction (up-down direction). The first movable member 30 includes a first protrusion portion 35 which has a circular column shape and protrudes from a front side of the first movable member 30. The first protrusion portion 35 is positioned adjacent to the through-hole 33 in the right-left direction.

On the other hand, the second movable member 40 includes the upper claw 42 on a lower end of the second movable member 40. The second movable member 40 includes latching arms 46 and 47 in an upper part of the second movable member 40. As shown in FIG. 5, the latching arms 46 and 47 extend downward from an extension portion 49 which extends in the right-left direction from a supporting column 48. Lower ends of the latching arms 46 and 47 opposite from the extension portion 49 are free ends curved outwards. The latching arms 46 and 47 are used for fastening the second movable member 40 at a predetermined position with a predetermined feeling of fixation upon the second movable member 40 arriving at the predetermined position. A mechanism of the fastening will be described below. In addition to the above-described components, the second movable member 40 includes a second protrusion portion 45 which has a circular column shape and protrudes from a back side of the second movable member 40 that faces to the first movable member 30. The second protrusion portion 45 is positioned on an opposite side of the through-hole 33 from the first protrusion portion 35 in the right-left direction.

The koma 60 includes a supporting shaft 61 that has a circular column shape and extends through the through-hole 33 of the first movable member 30. The supporting shaft 61 is positioned at a center of the koma 60. The koma 60 includes movable holes 63 and 64 which are positioned on opposite sides of the supporting shaft 61. Each of the movable holes 63 and 64 has an oval shape, and their major axes extend along a longitudinal direction of the koma 60. The movable hole 63 and the first protrusion portion 35 of the first movable member 30 are fitted to each other, and the movable hole 64 and the second protrusion portion 45 of the second movable member 40 are fitted to each other.

Figure 7A:
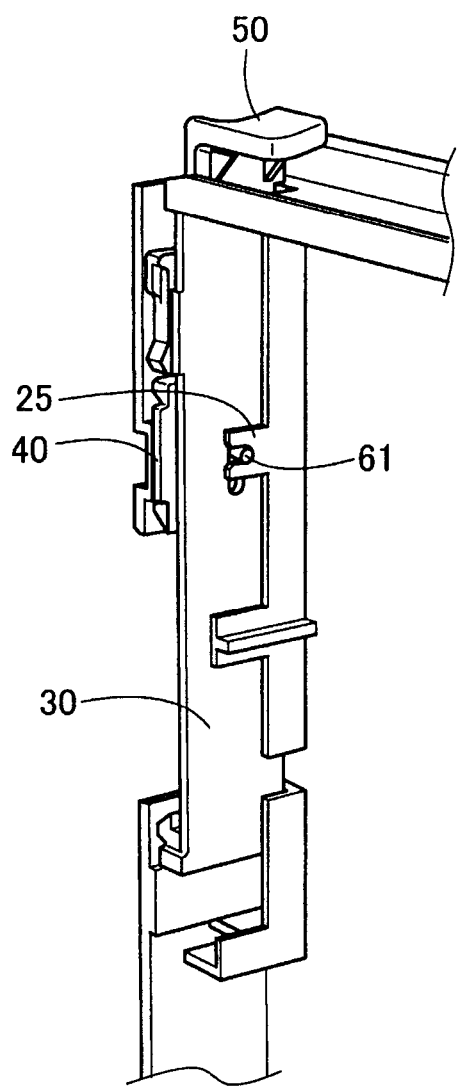
FIG. 7A is a view showing the attachment mechanism and its vicinity in FIG. 3.
Figure 7B:
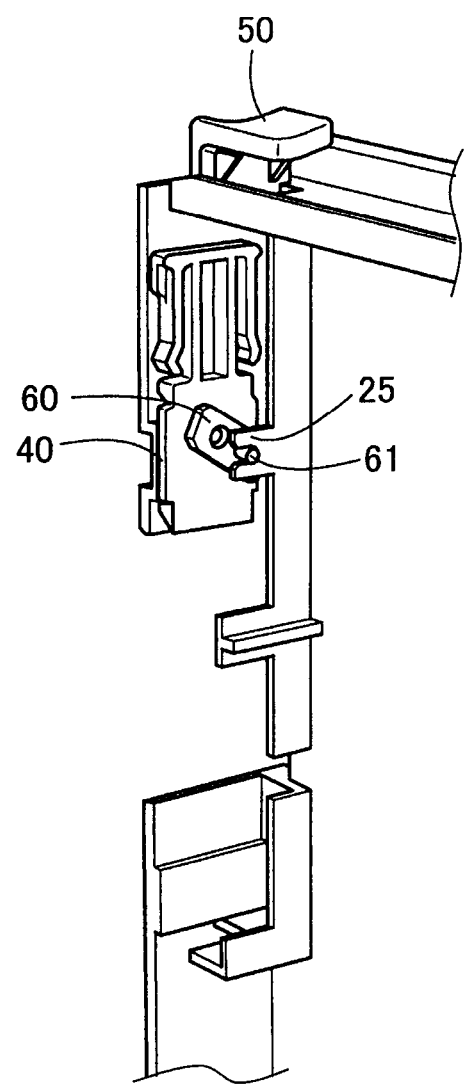
FIG. 7B is a view showing the attachment mechanism and its vicinity in FIG. 3 without a first movable member.

In FIG. 6, the first movable member 30 and the second movable member 40 are combined with each other with holding the koma 60 therebetween. These three members are combined as following steps. First, the movable hole 64 of the koma 60 is fitted to the second protrusion portion 45 of the second movable member 40. Subsequently, the supporting shaft 61 of the koma 60 is inserted into the through-hole 33 of the first movable member 30. Lastly, the first protrusion portion 35 of the first movable member 30 is fitted to the movable hole 63 of the koma 60. The combined three members are inserted into a housing space behind the attachment surface 21 shown in FIGS. 2 and 3. Since an end of the supporting shaft 61 of the koma 60 protrudes from the through-hole 33 of the first movable member 30, the protruding end of the supporting shaft 61 is fitted to the notch of the bearing portion 25, as shown in FIG. 7A. FIG. 7A shows the attachment mechanism 100 and its periphery in FIG. 3. In order to understand the movement of the attachment mechanism 100 clearly, FIG. 7B shows a state where the first movable member 30 is omitted from FIG. 7A. However, the operable portion 50 continuously connected to the first movable member 30 is shown in FIG. 7B for convenience.

The first movable member 30 may correspond to a first movable strip extending continuously from the operable portion and including a first claw that engages a ledge of the DIN rail 10, and the second movable member 40 may correspond to a second movable strip including a second claw that engages another ledge of the DIN rail 10. The lower claw 31 may correspond to the first claw, and the upper claw 42 may correspond to the second claw. The movable hole 63 and the first protrusion portion 35 may correspond to a first link portion by which the koma 60 is linked with the first movable strip, and the movable hole 64 and the second protrusion portion 45 may correspond to a second link portion by which the koma 60 is linked with the second movable strip.

The movement of the attachment mechanism 100 will be described referring to FIGS. 7A to 8C. FIGS. 8A to 8C schematically show the movement of the attachment mechanism 100. The alternate long and two short dashes lines in FIGS. 8A to 8C indicate a range of the DIN rail 10 when being attached to the attachment mechanism 100. The alternate long and short dash lines in FIGS. 8A to 8C indicate a position (height) RA of the supporting shaft 61 of the koma 60 in the up-down direction. FIG. 8A shows a front view of the attachment mechanism 100. FIG. 8B shows the attachment mechanism 100 in which the second movable member 40 is transparent so that the koma 60 is visualized. In both states shown in FIGS. 8A and 8B, the operable portion 50 has not been operated yet. Thus, the lower claw 31 and the upper claw 42 are separated from the DIN rail 10 in FIGS. 8A and 8B.

In FIG. 8B, the supporting shaft 61 of the koma 60 is positioned approximately at an upper end of the through-hole 33 of the first movable member 30. The first protrusion portion 35 is positioned approximately at an outer end of the movable hole 63, and the second protrusion portion 45 is positioned approximately at an outer end of the movable hole 64. In FIG. 8B, the koma 60 is rotated in a counter-clockwise direction by approximately 30 degrees from a state where the movable hole 63 and the movable hole 64 are arranged along a horizontal direction. A back side of the attachment mechanism 100 of FIGS. 8A and 8B is shown in FIGS. 7A and 7B. As shown in these drawings, the supporting shaft 61 of the koma 60 is fastened to the notch of the bearing portion 25 rotatably, but irremovable in the up-down direction.

When the operable portion 50 is pulled up from the state shown in FIGS. 8A and 8B, the first movable member 30 moves upward together with the operable portion 50. The lower claw 31 provided at the lower end of the first movable member 30 also moves upward, i.e. toward the ledge 14 of the DIN rail 10. At the same time, the first protrusion portion 35 of the first movable member 30 moves upward. On the other hand, since the koma 60 is irremovable in the up-down direction as described above, the koma 60 rotates in a clockwise direction when the first protrusion portion 35 moves upward. A distance between a center of the first protrusion portion 35 and a center of the supporting shaft 61 varies in accordance with the upward movement of the first protrusion portion 35. Since the movable hole 63 is an elongated hole, a position of the first protrusion portion 35 within the movable hole 63 is changed during the upward movement of the first protrusion portion 35. Accordingly, the movement of the first protrusion portion 35 in the up-down direction is converted to the rotation of the koma 60.

When the koma 60 rotates in the clockwise direction as described above, a movement opposite from the above-described movement between the movable hole 63 of the koma 60 and the first protrusion portion 35 of the first movable member 30 is occurred between the movable hole 64 of the koma 60 and the second protrusion portion 45 of the second movable member 40. That is, when the koma 60 rotates in the clockwise direction, the second protrusion portion 45 fitted to the movable hole 64 moves downward, and the second movable member 40 moves downward consequently. As a result, the upper claw 42 provided on the lower end of the second movable member 40 moves toward the ledge 12 of the DIN rail 10. Therefore, upon pulling up the operable portion 50, the lower claw 31 and the upper claw 42 move toward each other and engage with the ledges 14 and 12 of the DIN rail 10. The engaged state is shown in FIG. 8C.

Therefore, by pulling up of the operable portion 50, the attachment mechanism 100 attaches the device 20 to the DIN rail 10 via the lower claw 31 and the upper claw 42. Further, the second movable member 40 which arrives at the predetermined position by the pulling up of the operable portion 50 is fastened at the predetermined position with the predetermined feeling of fixation by the latching arms 46 and 47. Both FIGS. 9A and 9B show the back side of the attachment mechanism 100 and omit the first movable member 30, similar to FIG. 7B. Therefore, a rotation angle of the koma 60 in FIGS. 9A and 9B is opposite from that of FIGS. 8B and 8C.

FIG. 9A shows a state of the attachment mechanism 100 where the operable portion 50 has not been operated yet, and the second movable member 40 has not been moved downward yet. In this state, an upper surface of the extension portion 49 of the second movable member 40 is in contact with a stopper 70 formed behind the attachment surface 21. Hence, the second movable member 40 cannot be moved further upward than this position. When the operable portion 50 is pulled up, the second movable member 40 moves downward by the above-described rotation of the koma 60 and becomes in a state shown in FIG. 9B. During the movement of the second movable member 40 toward the state of FIG. 9B, outer sides of the lower ends of the latching arms 46 and 47 hit against protrusions 72 and 71 provided on right and left edges of the back side of the attachment surface 21. Thus, the latching arms 46 and 47 are bent inward by the protrusions 72 and 71 and move downward beyond the protrusions 72 and 71. As a result, a user manipulating the operable portion 50 can feel difficulty of moving the attachment mechanism 100 downward when the latching arms 46 and 47 move beyond the protrusions 72 and 71. The difficulty of moving is perceived by the user as the feeling of fixation. The movement of the ends of the latching arms 46 and 47 beyond the protrusions 72 and 71 causes the second movable member 40 to be fastened at the position shown in FIG. 9B. The latching arms 46 and 47 may correspond to a restrictor that restricts its own movement in a state where the first claw and the second claw are engaged with the DIN rail.

When the operable portion 50 is pushed down from the state shown in FIG. 9B, the koma 60 rotates in the clockwise direction and pushes up the second movable member 40. The ends of the latching arms 46 and 47 are bent inward once to move upward beyond the protrusions 72 and 71. Accordingly, the device 20 that has been attached to the DIN rail 10 via the lower claw 31 and the upper claw 42 is released from the DIN rail 10. This mechanism of the latching arms 46 and 47 and the protrusions 72 and 71 are referred to as a "latching mechanism". The feeling of fixation can be adjusted by changing shapes of the outer sides of the ends of the latching arms 46 and 47. The feeling of fixation when the upper claw 42 moves to engage with the DIN rail 10 may be changed from that when the upper claw 42 moves to separate from the DIN rail 10 by changing an inclination angle of the outward curved end of each latching arm 46 and 47 with respect to the movement direction of the second movable member 40.

According to the attachment mechanism 100 of the above-described first embodiment, the device 20 can be attached to the DIN rail 10 just by pulling up the operable portion 50 provided on a top part of the device 20 while the recess 15 formed on the attachment surface 21 of the device 20 is being pushed against the DIN rail 10. In other words, only operating of the single operable portion 50 in one direction (i.e. up-down direction) causes the lower claw 31 and the upper claw 42 to protrude in opposite directions toward the DIN rail 10 and to engage the ledges 12 and 14 of the DIN rail 10. Hence, the device 20 can be attached to the DIN rail 10 by one-touch operation of the operable portion 50. Therefore, workability of attachment can be improved, an attachment speed can be increased, and the number of processes in attachment procedure can be reduced. Furthermore, a cost including a maintenance fee can be reduced. Additionally, according to the configuration of the first embodiment, the device 20 can be attached to the DIN rail 10 by the pulling-up operation of the operable portion 50. Thus, even if the recess 15 of the device 20 cannot be fitted to the DIN rail 10 well, the device 20 can be prevented from being pushed down and dropping from the DIN rail 10 because an operation direction of the operable portion 50 is an upward direction.

Further, necessary members for achieving the above-described high-workability structure are only the three members: the first movable member 30 continuously extending from the operable portion 50; the second movable member 40; and the koma 60. There is no need to use a spring to urge the members in a particular direction. Additionally, it is facilitated to house the attachment mechanism 100 in the housing space of the device 20, and an assembly work of the device 20 also can be facilitated. Therefore, manufacturing of the attachment mechanism 100 or the device 20 including thereof can be facilitated, and productivity thereof can be improved. The attachment mechanism 100 is beneficial especially for mass-produced devices.

Second Embodiment

Figure 10:
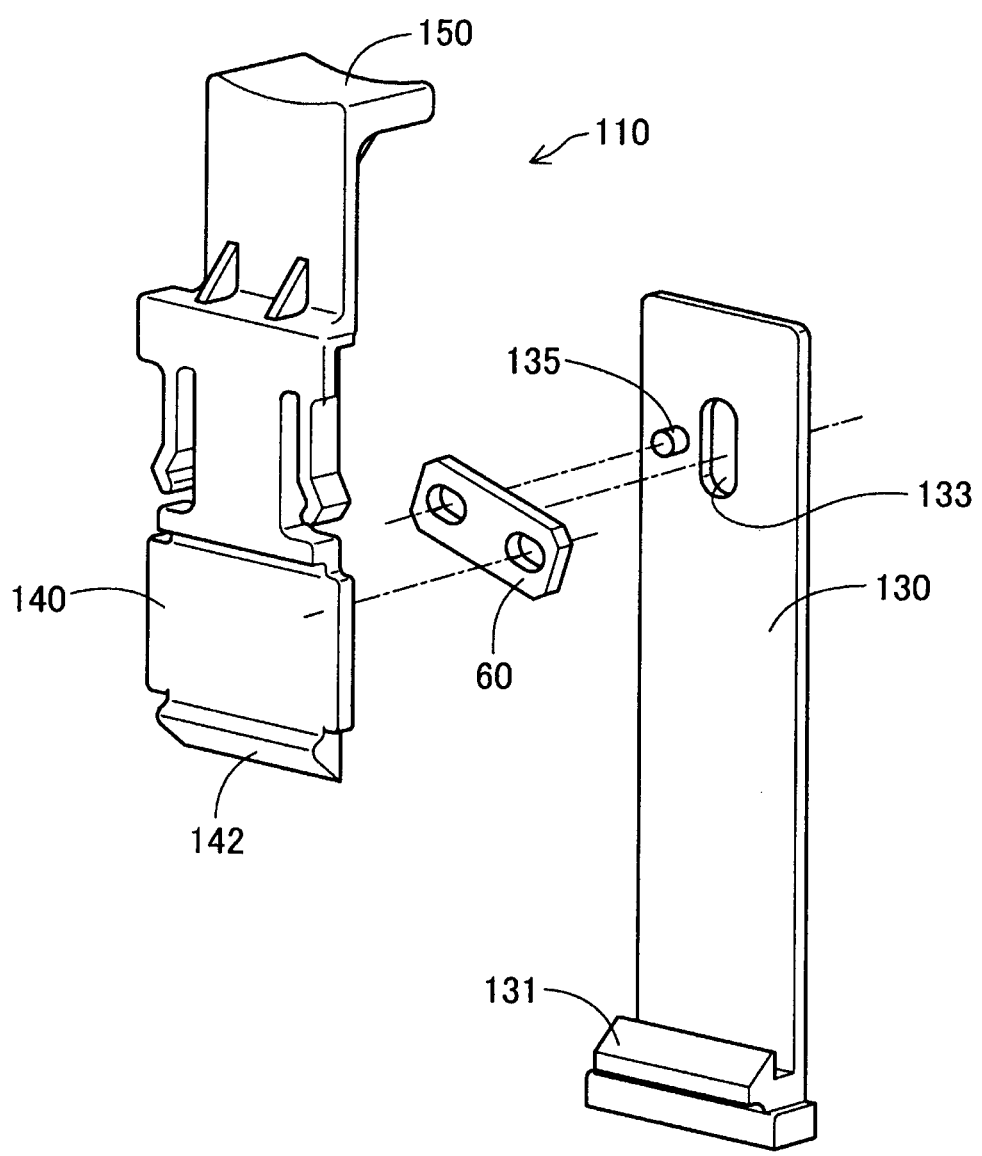
FIG. 10 is a disassembled view showing an attachment mechanism according to a second embodiment of the present disclosure.

Next, a second embodiment of the present disclosure will be described. FIGS. 10 to 11B show a perspective disassembled view of an attachment mechanism 110 of the second embodiment. The attachment mechanism 110 includes a first movable member 140, a second movable member 130, and a koma 60. The first movable member 140 continuously extends from an operable portion 150 and has an upper claw 142 that is positioned on a lower end of the first movable member 140 and faces downward. The second movable member 130 has a lower claw 131 that positioned on a lower end of the second movable member 130 and faces upward. The koma 60 is the same as that of the first embodiment. The second movable member 130 includes a through-hole 133 and a first protrusion portion 135 that is located adjacent to the through-hole 133, similar to the first embodiment. As shown in FIG. 11A, a second protrusion portion 145 having a circular column shape is provided on a back side of the first movable member 140, similar to the first embodiment.

The second embodiment is different from the first embodiment in the movable member continuously extending from the operable portion 150. Therefore, in the second embodiment, the first movable member 140 may correspond to the first movable strip, the second movable member 130 may correspond to the second movable strip, the lower claw 131 may correspond to the second claw, and the upper claw 142 may correspond to the first claw. The movable hole 63 and the first protrusion portion 135 may correspond to the second link portion, and the movable hole 64 and the second protrusion portion 145 may correspond to the first link portion.

FIG. 11B shows a state of the attachment mechanism 110 where these members are combined with each other, similar to the first embodiment. The combined attachment mechanism 110 is, similar to the first embodiment, inserted into a housing space provided in a casing body 22, and subsequently the casing cover 23 is attached to an opening side of the casing body 22.

In the above-described attachment mechanism 110 of the second embodiment, similar to the first embodiment, when the first movable member 140 is moved by operation of the operable portion 150, the movement is converted inversely and transmitted to the second movable member 130 by combination of the movable holes 63 and 64 of the koma 60, the first protrusion portion 135 and the second protrusion portion 145. A difference of the second embodiment from the first embodiment is that the device 20 is attached to a DIN rail 10 by pushing down the operable portion 150. When the operable portion 150 is pushed down, the upper claw 142 of the first movable member 140 and the lower claw 131 of the second movable member 130 protrude to engage with ledges 12 and 14 of the DIN rail 10. The difference of the second embodiment from the first embodiment is caused by the fact that the first movable member 30, in the first embodiment, has a length extending continuously from the operable portion 50 beyond the recess 15 and includes the lower claw 31 on the lower end of the first movable member 30 while the first movable member 140 continuously extending from the operable portion 150 is located above the recess 15 in the second embodiment. Therefore, in the second embodiment, the attachment of the device 20 can be completed by pushing down of the operable portion 150. A latching mechanism that fastens the first movable member 140 in a state where the operable portion 150 has been pushed down is similar to that of the first embodiment.

The second embodiment achieves similar operations and effects to the first embodiment except for the above-described point. In other words, the number of members constituting the attachment mechanism 110 is just three at least, and an installation procedure of the attachment mechanism 110 can be simplified. According to the second embodiment, even if malfunction such as bending or damage is generated in the supporting shaft 61 of the koma 60, the first protrusion portion 135 or the second protrusion portion 145 during use of the attachment mechanism 110, and if the second movable member 130 moves downward to lose engagement of the lower claw 131 with the ledge 14 of the DIN rail 10, the first movable member 140 can be fastened at its position by the latching mechanism. Therefore, the second embodiment exerts a beneficial effect that the device 20 is difficult to drop from the DIN rail 10.

Third Embodiment

Next, an attachment mechanism 200 of a third embodiment will be described below. FIGS. 12A and 12B schematically show configurations of the attachment mechanism 200 of the third embodiment. As shown in the drawings, a first movable member 230 continuously extending from an operable portion 250 includes an upper claw 231 at approximately center part of the first movable member 230, which is different from the lower claw 31 of the first embodiment that is located on the lower end of the first movable member 30. The upper claw 231 faces downward and may correspond to the first claw. The first movable member 230 is combined with a second movable member 240 and a koma 260, and the combined members are housed in a housing space of a casing body 220. The upper claw 231 is positioned at an upper edge of a recess 215 provided on an attachment surface 221. On the other hand, the second movable member 240 includes a lower claw 242 that faces upward and may correspond to the second claw, and the lower claw 242 is positioned at a lower edge of the recess 215.

In the third embodiment, the first movable member 230 may correspond to the first movable strip, the second movable member 240 may correspond to the second movable strip, the upper claw 231 may correspond to the first claw, and the lower claw 242 may correspond to the second claw. Two movable holes and two protrusion portions are combined, respectively, to correspond to the first and second link portions, similar to the first embodiment.

When the operable portion 250 is operated to be pushed downward, the first movable member 230 moves downward, and the upper claw 231 also moves downward to engage with a ledge 12 of a DIN rail 10. The movement of the first movable member 230 causes the second movable member 240 to move in an opposite direction, i.e. an upward direction, through a rotation movement of the koma 260 about a supporting shaft 261 of the koma 260 fitted to a first protrusion portion 235 of the first movable member 230. A through-hole 233 of the first movable member 230 through which the supporting shaft 261 of the koma 260 extends has a major axis along the up-down direction. Thus, even when the first movable member 230 moves in the up-down direction, interference between the first movable member 230 and the supporting shaft 261 can be limited, similar to the first embodiment. A latching mechanism provided in the second movable member 240 fastens the lower claw 242 of the second movable member 240 at a position where the lower claw 242 engages with a ledge 14 of the DIN rail 10, similar to the first and second embodiments.

According to the above-described third embodiment, similar operations and effects to that of the second embodiment can be obtained. Further, according to the third embodiment, even if a malfunction such as bending or damage is generated in the supporting shaft 261 of the koma 260 or in the first protrusion portion 235, an engagement between the upper claw 231 and the ledge 12 of the DIN rail 10 can be prevented from being released because an engagement direction of the upper claw 231 of the first movable member 230 is coincident with the gravitational direction. The second movable member 240 is fastened at its position by the latching mechanism, and thus, the second movable member 240 has a beneficial effect that, even when such malfunction is generated, an attachment state of the device 20 to the DIN rail 10 is not change mostly. Additionally, the upper claw 231 provided on the first movable member 230 directly and continuously extending from the operable portion 250 receives a pushing force directly from the operable portion 250 and engages with the ledge 12 of the DIN rail 10. Therefore, similar to the second embodiment, a user can directly feel the engagement of the upper claw 231.

Fourth Embodiment

Figure 13A:
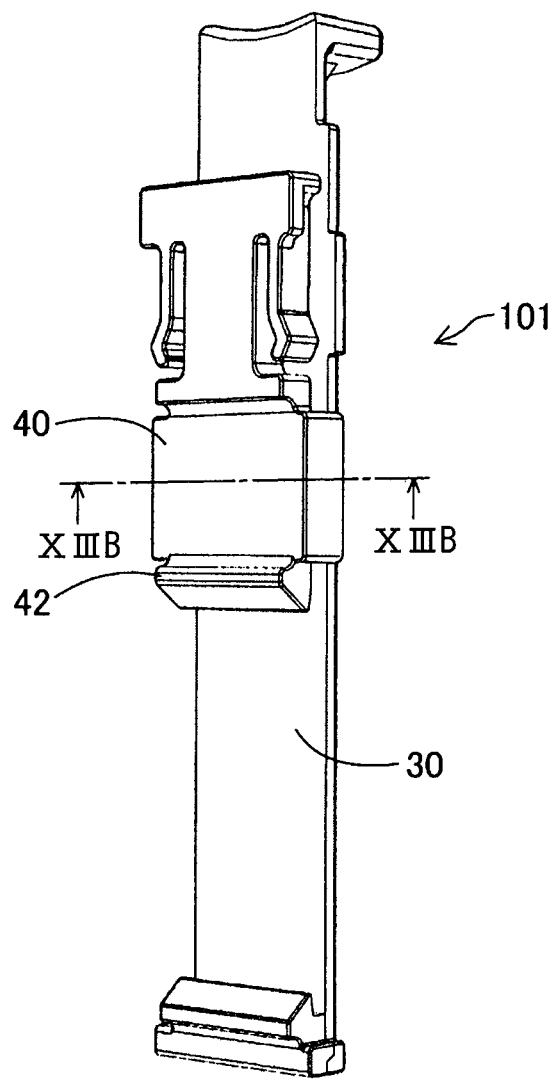
FIG. 13A is a view showing an attachment mechanism according to a fourth embodiment of the present disclosure.
Figure 13B:
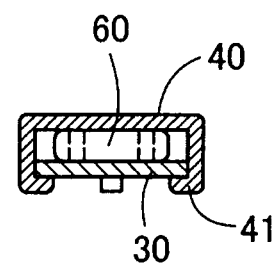
FIG. 13B is a cross-sectional view taken along a line XIIIB-XIIIB of FIG. 13A.

Next, a fourth embodiment of the present disclosure will be described below. FIGS. 13A and 13B are schematic diagrams showing an attachment mechanism 101 of the fourth embodiment. The attachment mechanism 101 of the fourth embodiment has a similar configuration to that of the first embodiment. Therefore, main components in FIGS. 13A and 13B are assigned with the same numerals as the first embodiment. A difference from the first embodiment is that a second movable member 40 includes an arm portion 41 that holds therein a koma 60 and a first movable member 30, as shown in FIG. 13B illustrating a sectional view taken along a line XIIIB-XIIIB of FIG. 13A. The arm portion 41 may be provided on both sides of the second movable member 40 as separate parts. The arm portion 41 may be molded with using an injection machine having a separation-type core cylinder.

A protruding amount of the arm portion 41 is small, and the second movable member 40 is made of synthetic resin. Thus, the arm portion 41 is deformable. Therefore, it is easy to deform the arm portion 41 to hold therein the koma 60 and the first movable member 30. In a state of FIGS. 13A and 13B, the second movable member 40 is slidable relative to the first movable member 30. However, the second movable member 40 is temporarily fixed to the first movable member 30 because of existence of the arm portion 41. Thus, once the attachment mechanism 101 is assembled, the first movable member 30, the second movable member 40 and the koma 60 can be handled in an integrated state. Accordingly, insertion of the attachment mechanism 101 into a housing space of the casing body 22 can be facilitated. Similar operations and effects to the first embodiment can be obtained also in the present embodiment, for example, easiness in attaching of the attachment mechanism 101 to the DIN rail 10.

Although the present disclosure has been fully described in connection with the preferred embodiments thereof with reference to the accompanying drawings, it is to be noted that various changes and modifications described below will become apparent to those skilled in the art.

In the first to fourth embodiments, one of the movable strips: the first movable strip having the first claw and the second movable strip having the second claw, extends over an approximately entire length of the attachment mechanism, so that movement of either one of the movable strips is transferred to another of the movable strips. On the other hand, as schematically shown in FIGS. 14A and 14B, movements of both the strips may be transferred to each other through a coupling portion 239 connecting therebetween. FIGS. 14A and 14B show an operation of a link mechanism of a first modification of the present disclosure by using a relationship between the first movable member 230 and the second movable member 240 of the third embodiment. As shown in FIG. 14A, the coupling portion 239 transmits an up-down movement of the first movable member 230 provided with the operable portion 250 to the koma 260. When the operable portion 250 is operated such that the first movable member 230 is moved downward, as shown in FIG. 14B, the koma 260 is rotated and moves the second movable member 240 upward.

The movements of the first movable member 230 and the second movable member 240 cause the upper claw and the lower claw to engage the ledges of the DIN rail 10, similar to the other embodiments. In the configuration of the attachment mechanism 210 shown in FIGS. 14A and 14B, the opposite ends of the coupling portion 239 are attached to the first movable member 230 and the koma 260 rotatably. In a case where a protrusion portion of the coupling portion 239 is fitted to the oval rotatable hole of the koma 260 similar to the other embodiments, the coupling portion 239 may be fixed to the first movable member 230. In this case, the first movable member 230 and the coupling portion 239 may be integrated as a single component.

Accordingly, an amount of resin used for the first movable member 230 can be reduced as compared to the third embodiment. Further, an area of the member passing through the recess 15 in the up-down direction can be reduced, and thus designing of the recess 15 becomes easy. The link mechanism is described by using the configuration of the third embodiment, but the link mechanism can be applicable to the other embodiments. In FIGS. 14A and 14B, the coupling portion 239 has a shape and is arranged to be coplanar with the first movable member 230 for example, but an area of the coupling portion 239 can be reduced. Thus, the coupling portion 239 may have a rod shape. Further, the coupling portion 239 may be arranged on a lateral side of the attachment surface 21. The coupling portion 239 may be arranged on an edge side of the attachment surface 21.

Next, a second modification of the present disclosure will be described. In the second modification, a mechanism converting a movement into an opposite direction is modified. In the above-described embodiments, all the distances from the supporting shaft of the koma to the movable holes are equal to each other. More specifically, all the distances from the supporting shaft to the two protrusion portions fitted to the movable holes (e.g., the first protrusion portion 35 and the second protrusion portion 45 in FIGS. 4 and 5) are equal to each other. Therefore, a movement distance of the first movable member 30 in a downward direction becomes approximately equal to a movable distance of the second movable member 40 in an upward direction.

When the distances from the supporting shaft to the two protrusion portions are changed, the movement distances of the first movable strip and the second strip can be change arbitrarily. In FIG. 15A, similar to the first embodiment, a first movable member 330 and a second movable member 340 are provided. FIG. 15A corresponds to FIG. 8B. Distances L1 and L2 indicate respective distances between a supporting shaft 361 of a koma 360 and protrusion portions. Distances S1 and S2 indicate longest movement distances of the second movable member 340 and the first movable member 330 in the up-down direction, respectively. In FIG. 15B, a distance R1 indicates an actual displacement of an upper claw 342, and a distance R2 indicates an actual displacement of a lower claw 331. Further, a distance F1 indicates a distance from an initial position of the upper claw 342 on an edge of the recess 15, i.e. a hidden position of the upper claw 342.

When the distances L1 and L2 from the supporting shaft 361 to the protrusion portions are equal to each other similar to the first embodiment, as shown in FIG. 15C, the longest movement distances S1 and S2 are equal to each other. However, for example, when the distance L1 from the supporting shaft 361 to the protrusion portion of the first movable member 330 is longer than the distance L2 from the supporting shaft 361 to the protrusion portion of the second movable member 340, the longest movement distance S2 of the lower claw becomes shorter than the longest movement distance S1 of the upper claw. On the contrary, when the distance L1 from the supporting shaft 361 to the protrusion portion of the first movable member 330 is shorter than the distance L2 from the supporting shaft 361 to the protrusion portion of the second movable member 340, the longest movement distance S1 of the upper claw becomes shorter than the longest movement distance S2 of the lower claw.

Therefore, by utilizing the above relationships, the attachment structure can be designed as described below. The relationship between the distances L1 and L2 is set such that the distance L1 is shorter than the distance L2 (L1<L2). The upper claw 342 is positioned at an initial position to protrude by the distance F1 from the hidden position. The lower claw 331 is positioned at the hidden position similar to the first embodiment. In this state, since the upper claw 342 slightly protrudes into the recess initially, the upper claw 342 can be first engaged with the ledge 12 of the DIN rail 10 at the time of attaching the device 20 to the DIN rail 10. Subsequently, the operable portion is operated to move the first movable member 330 and the second movable member 340 inward of the recess. Accordingly, the movements and engagements of both claws with the ledges 12 and 14 of the DIN rail 10 are completed. The displacement R1 of the upper claw 342 is less than the displacement R2 of the lower claw 331, but the upper claw 342 has been displaced by the distance F1 from the upper edge of the recess before the operation of the operable portion, as shown in FIG. 15B. Therefore, the distance from the upper edge of the recess to the upper claw 342 becomes approximately equal to the distance from the lower edge of the recess to the lower claw 331 after the completion of the movements thereof. In other words, the distance F1 plus the distance R1 equals the distance R2 (F1+R1=R2), and an engagement state of the upper claw 342 with the DIN rail 10 becomes approximately the same as an engagement state of the lower claw 331 with the DIN rail 10.

As described in the second modification, the displacements caused by the movement conversion with use of the koma can be adjusted. In the example of FIGS. 15A to 15C, the displacement of the upper claw 342 is reduced, and the upper claw 342 at the initial position is configured to protrude from the upper edge of the recess. However, the relationship between the upper and lower claws may be reversed.

The conversion of the movement directions with use of the koma can be achieved in other various embodiments. For example, in the first embodiment, the relationships between the movable hole 63, 64 and the protrusion portion 35, 45 may be reversed. In other words, the koma may have protrusion portions, and the first and second movable members 30 and 40 may have movable holes. Further, the movable holes 63 and 64 may be U-shaped grooves as long as the protrusion portion does not remove from the movable holes 63 and 64. Moreover, the movable holes 63 and 64 not need to be through-holes, but may be bottomed.

The koma can be supported rotatably with use of the supporting shaft in various configurations. For example, the koma may have a through-hole at an approximately center part thereof, and a shaft member may be driven in the through-hole from the casing side. The supporting shaft may extend through the second movable member 40 in an opposite direction, for the first embodiment for example, and being supported rotatably on a back side of the attachment surface 21.

The conversion in the movement direction by the koma can be achieved by means other than the rotation of the koma. For example, a steel belt is used as the koma, for the second embodiment for example, an end of the steel belt is fastened to the operable portion 150. The steel belt extends in the downward direction, and is folded back at a lower edge of the housing space into which the attachment mechanism 110 is inserted. Another end of the steel belt is fastened to the second movable member 130. The lower edge of the housing space has a round shape with a predetermined curvature R such that the steel belt is folded smoothly at the lower edge. Accordingly, when the operable portion 150 moves downward, the end of the steel belt moves upward, and the second movable member 130 and the lower claw 131 moves upward. With use of such configuration, the koma not need to be rotated. According to this configuration, the engagement between the movable hole and the protrusion portion is unnecessary, and the device configuration can be simplified.

The invention disclosed in the present disclosure can be exploited in various configurations other than the above-described configurations. For example, the latching mechanism not needs to be limited to the configuration using the latching arms 46 and 47 of the above-described embodiments. For example, in the first and third embodiments, a latching mechanism may be provided in the first movable member 30 or 230. In this case, the latching mechanism of the first movable member 30 or 230 may extend toward the wall 26 in a direction perpendicular to the width direction of the first movable member 30, and may be fitted into a recess part of the wall 26. Moreover, the latching mechanism may be provided by forming a narrowed part in the movable holes 63 and 64, for example. The first protrusion portion 35 and the second protrusion portion 45 move inside the movable hole 63 and the movable hole 64 along their major axes in accordance with the operation of the operable portion 50. Studying the movements of the protrusion portions, when the movable member moves downward (or upward) by the operation of the operable portion, as shown in FIGS. 8B and 8C, the protrusion portion once moves from an outer end to an inner end inside the movable hole, and then moves to the outer end again. In other words, when the movable member is located at a lower end or an upper end in its movable range, the protrusion portion is located on the outer end inside the movable hole. Therefore, the narrowed part may be provided in the movable hole adjacent to the outer end. The protrusion portion or the movable hole may move beyond the narrowed part with being deformed. Thus, the protrusion portion is fastened in the outer end of the movable hole. According to this configuration, the latching mechanism can be provided by the movable hole and the protrusion portion. Hence, the device configuration can be simplified and miniaturized. Further, the movable member can be fastened at both the upper end position and the lower end position. The major axis of the movable hole no needs to be parallel to a radial direction of the koma, and may be inclined with the radial direction at a predetermined inclination angle. In this case, a displacement of the protrusion portion relative to a rotation angel of the koma can be changed depending on the inclination angle or the direction of the major axis of the movable hole.

The mechanism for fastening the movable members are not limited to the mechanical configurations such as the latching arm 46 and the protrusion 72, and may adopt a structure attracting the movable members with use of a magnet.

The invention disclosed in the present disclosure can be exploited as the above-described embodiments and the modifications. Thus, with respect to the operable portion, the device 20 can be attached to the DIN rail 10 by operating the operable portion upward (first and fourth embodiments), and the device 20 can be attached to the DIN rail 10 by operating the operable portion downward (second and third embodiments). Further, the claw to which the operation force is directly transmitted may be the upper claw above the DIN rail 10 (second and third embodiments) or may be the lower claw below the DIN rail 10 (first and fourth embodiments). Therefore, the configurations of the attachment mechanism can be arbitrarily selected depending on shape or usage of a device to be designed, on wideness inside a control panel to which the device 20 is attached, or on largeness of space above the device 20.

The variety of embodiments of the invention is described above, but the invention is not limited to these embodiments or the modifications. The invention can be exploited in various configurations without departing from the scope of the invention. For example, the outer shape of the koma may be circular. The two movable holes may be arranged at positions shifted from the straight line extending through the center of the supporting shaft. The shape of the operable portion may be changed variously. The operable portion not needs to be integrated with the first movable strip, and may be separated from the first movable strip and be fixed with the first movable strip by adhesives or screws. The operable portion may be just put together with the first movable strip. The upper and lower claws are integrated with the first and second movable members, but may be separated. When the upper and lower claws are separated from the first and second movable members, at least one of the upper claw, the lower claw, the first movable member and the second movable member may be made of metal.

To sum up, the attachment structure of the above embodiments may be described as follows. An attachment structure is used for attaching a housing to a DIN rail by fitting a recess provided on a surface of the housing to the DIN rail. The attachment structure includes an operable portion, a first movable strip, a second movable strip and a koma. The operable portion is operable by an operator, and the first movable strip extends continuously from the operable portion and is movable along the surface of the housing in a first direction toward the recess and in a second direction opposite from the first direction. The first movable strip includes a first claw that moves toward the DIN rail in accordance with a movement of the first movable strip in the first direction and engages a ledge of the DIN rail located adjacent to one of two edges of the recess. The second movable strip includes a second claw that moves toward the DIN rail in accordance with the movement of the first movable strip in the first direction and engages another ledge of the DIN rail located adjacent to another of the two edges of the recess. The koma converts the movement of the first movable strip in the first direction to a movement of the second movable strip in the second direction, and converts a movement of the first movable strip in the second direction to a movement of the second movable strip in the first direction.

According to the attachment structure for the housing, when the operable portion is operated, the first movable strip moves. The movement of the first movable strip is converted to a movement of the second movable strip in an opposite direction. Hence, only by operating the operable portion, the first claw of the first movable strip and the second claw of the second movable strip can be engaged with or separated from the ledges of the DIN rail fitted to the recess. Therefore, the attachment mechanism of the housing can be achieved only by at least the three members: the first movable strip continuously extending from the operable portion, the second movable strip and the koma. In the present specification, the so-called "claw" means a member that engages with the ledge of the DIN rail. The first claw and the second claw may have any shape and may be made of any material as long as they are capable of engaging with the ledge of the DIN rail. Generally, the first and second movable strips including the first and second claws are made of synthetic resin or metal.

The koma may be rotatable in a positive direction in accordance with the movement of the first movable strip in the first direction, and rotatable in a negative direction in accordance with the movement of the first movable strip in the second direction. The koma may be linked with the first movable strip by a first link portion and with the second movable strip by a second link portion. The first link portion and the second link portion may be located on opposite sides of a reference axis extending through a rotational center of the koma along a direction of the movement of the first movable strip. Accordingly, the simple rotation of the koma can cause the first movable strip and the second movable strip to move in the opposite directions. The "opposite direction" in the present specification is not limited to a direction opposite by 180-degree exactly, and includes not only an "opposite direction" realized with a general assembling accuracy, but also a movement direction intended to be slightly diverted from the 180-degree opposite direction such that either one of the movable strips moves toward the ledge of the DIN rail obliquely.

The first claw may be disposed on the first movable strip on an opposite side of the recess from the operable portion. The second movable strip may be located at a predetermined position between the operable portion and the recess. The koma may be disposed to rotate at a predetermined position relative to the housing. The koma may be linked with the first movable strip by the first link portion that is located at a position away from the rotational center by a first distance. The koma may be linked with the second movable strip by the second link portion that is located at a position away from the rotational center by a second distance on an opposite side of the reference axis from the first link portion. Accordingly, when the operable portion is operated to move away from the housing, the first claw of the first movable strip and the second claw of the second movable strip can be engaged with the ledges of the DIN rail. Therefore, the housing can be attached to the DIN rail easily.

Alternatively, the first claw may be disposed on the first movable strip between the operable portion and the recess. The second movable strip may be located on an opposite side of the recess from the operable portion. The koma may be disposed to rotate at a predetermined position relative to the housing. The koma may be linked with the first movable strip by the first link portion that is located at a position away from the rotational center by a first distance. The koma may be linked with the second movable strip by the second link portion that is located at a position away from the rotational center by a second distance on an opposite side of the reference axis from the first link portion. Accordingly, when the operable portion is operated to move toward the housing, the first claw of the first movable strip and the second claw of the second movable strip can be engaged with the ledges of the DIN rail. Therefore, the housing can be attached to the DIN rail easily.

Furthermore, the first movable strip and the second movable strip may be located to face each other across the recess. The first claw may be disposed on an end part of the first movable strip adjacent to the recess. The second claw may be disposed on an end part of the second movable strip adjacent to the recess. The koma may be disposed adjacent to the second movable strip to rotate at a predetermined position relative to the housing. The koma may be linked with a coupling portion by the first link portion that is located at a position away from the rotational center by a first distance, the coupling portion being connected to the first movable strip. The koma may be linked with the second movable strip by the second link portion that is located at a position away from the rotational center by a second distance on an opposite side of the reference axis from the first link portion. In this case, the first movable strip and the second movable strip face each other across the recess. When the operable portion is operated to move toward the housing, the first claw of the first movable strip and the second claw of the second movable strip can be engaged with the ledges of the DIN rail. Therefore, the housing can be attached to the DIN rail easily.

A first distance from the rotational center of the koma to the first link portion may be equal to a second distance from the rotational center of the koma to the second link portion. When the first distance and the second distance are equal to each other, a movement distance of the first movable strip and a movement distance of the second movable strip can be set equal to each other easily. The movement distances of the first and second movable strips depend not only on the first and second distances but also on arrangements of the first link portion and the second link portion around the rotational center of the koma. If these arrangements are symmetric about the rotational center, the movement distances of the first and second movable strips can be made to be equal to each other by setting the first and second distances to be equal. Or, the movement distances of the first and second movable strips can be made to be different from each other easily by adjusting the first and second distances.

One of the first claw and the second claw may protrude by a predetermined length from the edge of the recess into the recess in a non-operated state of the operable portion. A first distance from the rotational center of the koma to the first link portion may be different from a second distance from the rotational center of the koma to the second link portion so that a displacement of the protruding claw during an operation of the operable portion becomes shorter than a displacement of another claw. Accordingly, the housing can be attached to the DIN rail while either one of the first claw and the second claw protrudes from the edge of the recess as an initial position. Furthermore, engagement states of the both claws with the ledges of the DIN rail after completion of the engagement can be made to be similar to each other.

At least one of the first movable strip and the second movable strip may include a restrictor that restricts its own movement in a state where the first claw and the second claw are engaged with the DIN rail by operation of the operable portion. Accordingly, the movement of the movable strip can be restricted in a state where the first and second claws engage with the DIN rail, and the housing can be made to be difficult to be detached from the DIN rail.

Additional advantages and modifications will readily occur to those skilled in the art. The disclosure in its broader terms is therefore not limited to the specific details, representative apparatus, and illustrative examples shown and described.

What is claimed is:

1. An attachment structure for attaching a housing of a device to a DIN rail by fitting a recess provided on a surface of the housing to the DIN rail, the attachment structure comprising:
    an operable portion operable by an operator;
    a first movable strip extending continuously from the operable portion and being movable along the surface of the housing in a first direction toward the recess and in a second direction opposite from the first direction, the first movable strip including a first claw that moves toward the DIN rail in accordance with a movement of the first movable strip in the first direction and engages a ledge of the DIN rail located adjacent to one of two edges of the recess;
    a second movable strip including a second claw that moves toward the DIN rail in accordance with the movement of the first movable strip in the first direction and engages another ledge of the DIN rail located adjacent to another of the two edges of the recess; and
    a koma converting the movement of the first movable strip in the first direction to a movement of the second movable strip in the second direction and converting a movement of the first movable strip in the second direction to a movement of the second movable strip in the first direction;
    wherein the koma is rotatable in a positive direction in accordance with the movement of the first movable strip in the first direction, and rotatable in a negative direction in accordance with the movement of the first movable strip in the second direction.

2. The attachment structure according to claim 1, wherein the koma is linked with the first movable strip by a first link portion and the second movable strip by a second link portion, the first link portion and the second link portion being located on opposite sides of a reference axis extending through a rotational center of the koma along a direction of the movement of the first movable strip.

3. The attachment structure according to claim 2, wherein
the first claw is disposed on the first movable strip on an opposite side of the recess from the operable portion,
the second movable strip is located at a predetermined position between the operable portion and the recess,
the koma is disposed to rotate at a predetermined position relative to the housing,
the koma is linked with the first movable strip by the first link portion that is located at a position away from the rotational center by a first distance, and
the koma is linked with the second movable strip by the second link portion that is located at a position away from the rotational center by a second distance on an opposite side of the reference axis from the first link portion.

4. The attachment structure according to claim 2, wherein
the first claw is disposed on the first movable strip between the operable portion and the recess,
the second movable strip is located on an opposite side of the recess from the operable portion,
the koma is disposed to rotate at a predetermined position relative to the housing,
the koma is linked with the first movable strip by the first link portion that is located at a position away from the rotational center by a first distance, and
the koma is linked with the second movable strip by the second link portion that is located at a position away from the rotational center by a second distance on an opposite side of the reference axis from the first link portion.

5. The attachment structure according to claim 2, wherein
the first movable strip and the second movable strip are located to face each other across the recess,
the first claw is disposed on an end part of the first movable strip adjacent to the recess,
the second claw is disposed on an end part of the second movable strip adjacent to the recess,
the koma is disposed adjacent to the second movable strip to rotate at a predetermined position relative to the housing,
the koma is linked with a coupling portion by the first link portion that is located at a position away from the rotational center by a first distance, the coupling portion being connected to the first movable strip, and
the koma is linked with the second movable strip by the second link portion that is located at a position away from the rotational center by a second distance on an opposite side of the reference axis from the first link portion.

6. The attachment structure according to claim 2, wherein a first distance from the rotational center of the koma to the first link portion is equal to a second distance from the rotational center of the koma to the second link portion.

7. The attachment structure according to claim 2, wherein
one of the first claw and the second claw protrudes by a predetermined length from the edge of the recess into the recess in a non-operated state of the operable portion, and
a first distance from the rotational center of the koma to the first link portion is different from a second distance from the rotational center of the koma to the second link portion so that a displacement of the protruding claw during an operation of the operable portion becomes shorter than a displacement of another claw.

8. The attachment structure according to claim 1, wherein at least one of the first movable strip and the second movable strip includes a restrictor that restricts its own movement in a state where the first claw and the second claw are engaged with the DIN rail by operation of the operable portion.

* * * * *